(12) United States Patent
Chang

(10) Patent No.: US 11,036,016 B2
(45) Date of Patent: Jun. 15, 2021

(54) ULTRA-SMALL FORM FACTOR RECEPTACLES FOR FIBER OPTICAL CONNECTORS

(71) Applicant: Senko Advanced Components, Inc., Marlborough, MA (US)

(72) Inventor: Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/843,187

(22) Filed: Apr. 8, 2020

(65) Prior Publication Data

US 2020/0285002 A1   Sep. 10, 2020

Related U.S. Application Data

(62) Division of application No. 16/508,541, filed on Jul. 11, 2019, now Pat. No. 10,690,864.

(60) Provisional application No. 62/696,710, filed on Jul. 11, 2018.

(51) Int. Cl.
  *G02B 6/42* (2006.01)
  *G02B 6/12* (2006.01)
  *G02B 6/38* (2006.01)

(52) U.S. Cl.
  CPC ............. *G02B 6/424* (2013.01); *G02B 6/421* (2013.01); *G02B 6/4262* (2013.01); *G02B 6/4292* (2013.01); *G02B 6/3825* (2013.01); *G02B 2006/12111* (2013.01)

(58) Field of Classification Search
  CPC ...... G02B 6/3825; G02B 6/421; G02B 6/424; G02B 6/4262; G02B 6/4292; G02B 2006/12111
  See application file for complete search history.

(56) References Cited

U.S. PATENT DOCUMENTS

| | | | |
|---|---|---|---|
| 5,142,597 A | 8/1992 | Mulholland et al. | |
| 5,937,121 A | 8/1999 | Ott et al. | |
| 6,443,627 B1 | 9/2002 | Anderson et al. | |
| 7,198,409 B2 | 4/2007 | Smith et al. | |
| 10,591,681 B2 * | 3/2020 | Smith | G02B 6/4452 |
| 10,690,864 B2 | 6/2020 | Chang | |
| 2010/0054668 A1 | 3/2010 | Nelson | |
| 2010/0183265 A1 | 7/2010 | Barnes et al. | |
| 2012/0301080 A1 | 11/2012 | Gniadek | |
| 2014/0147082 A1 | 5/2014 | Lee | |
| 2014/0241689 A1 | 8/2014 | Bradley et al. | |

OTHER PUBLICATIONS

International Search Report and Written Opinion, Application No. PCT/US19/041341, dated Oct. 2, 2019, pp. 16.

* cited by examiner

*Primary Examiner* — Daniel Petkovsek

(57) ABSTRACT

A receptacle for receiving and securing a plurality of fiber optical connectors holding two or more LC-type optical ferrules with a fiber therein. A receptacle retainer assembly, has a pair of opposing hooks at a first end that accept and secure the fiber optical connector within receptacle, and a second end of the receptacle retainer assembly has a latch to secure to a fiber stub holder comprising a plurality of fiber stubs.

7 Claims, 16 Drawing Sheets

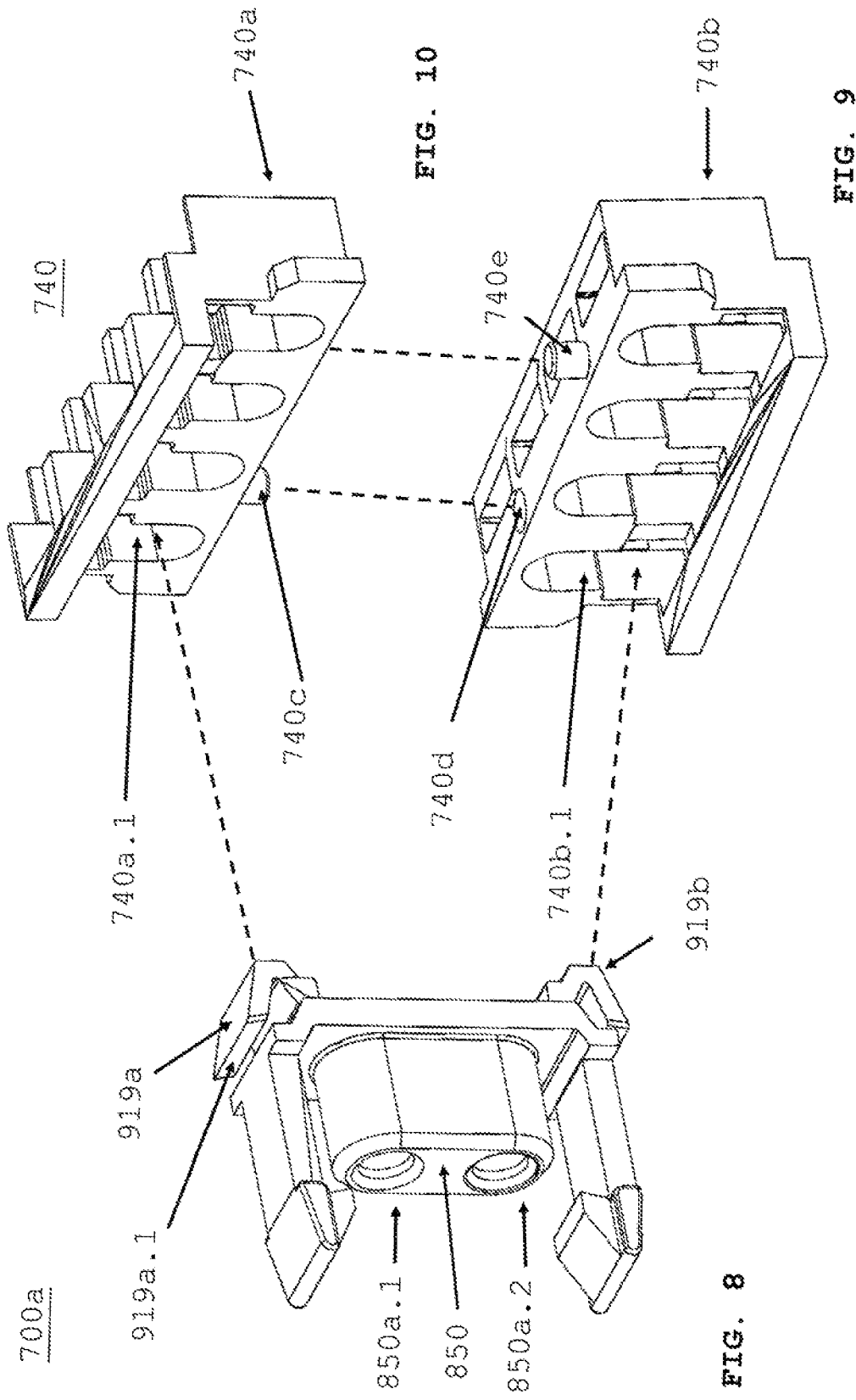

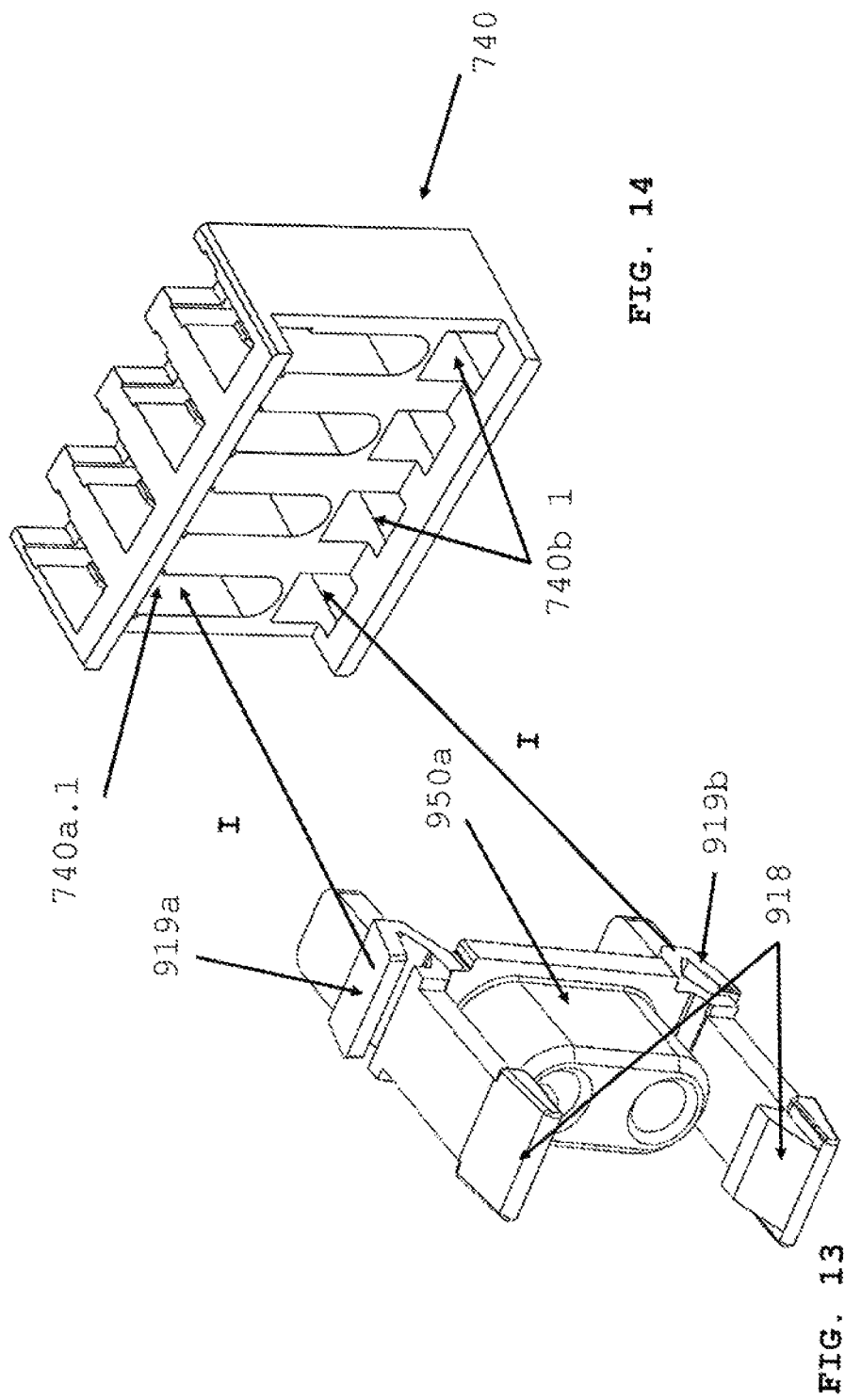

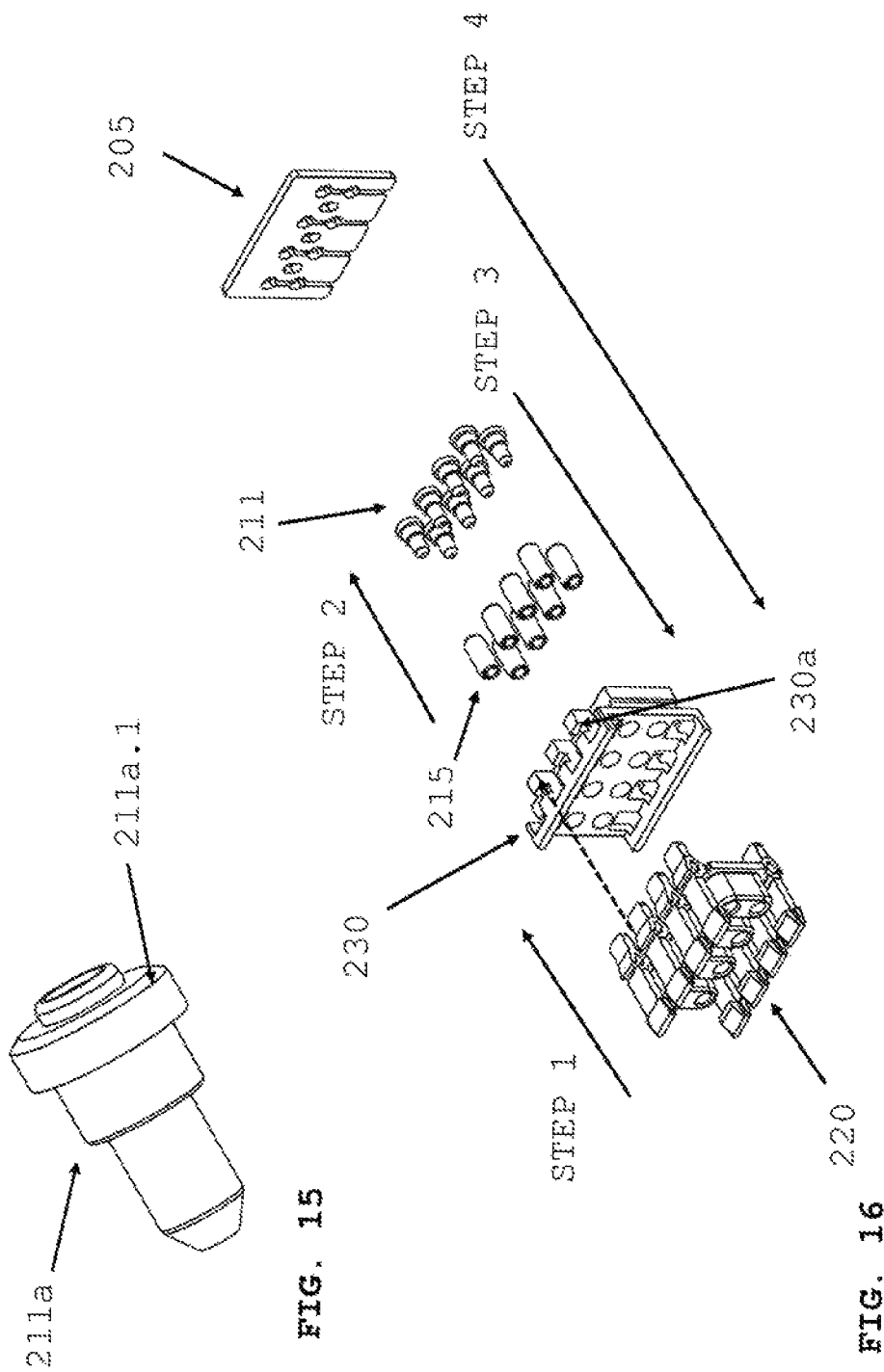

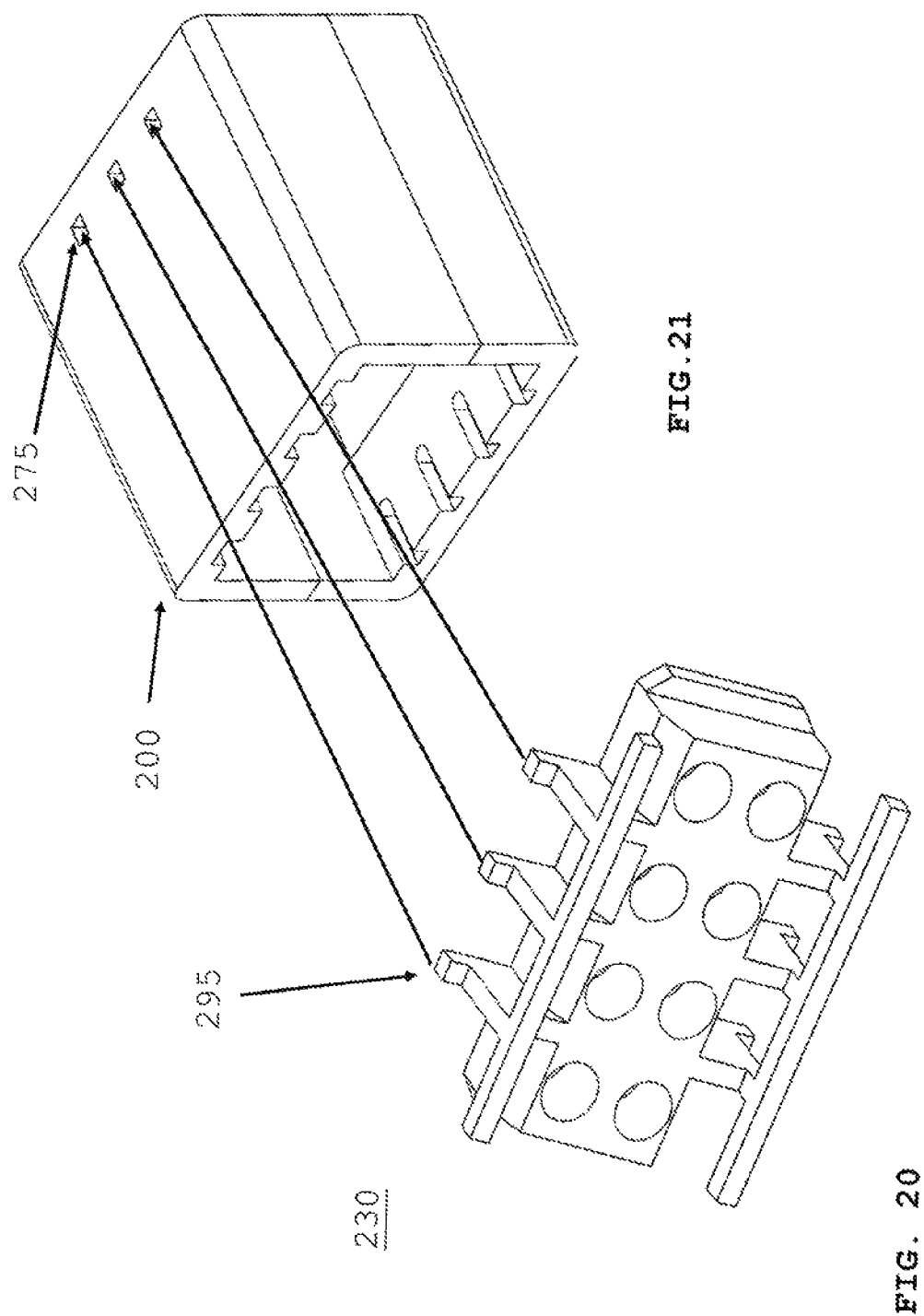

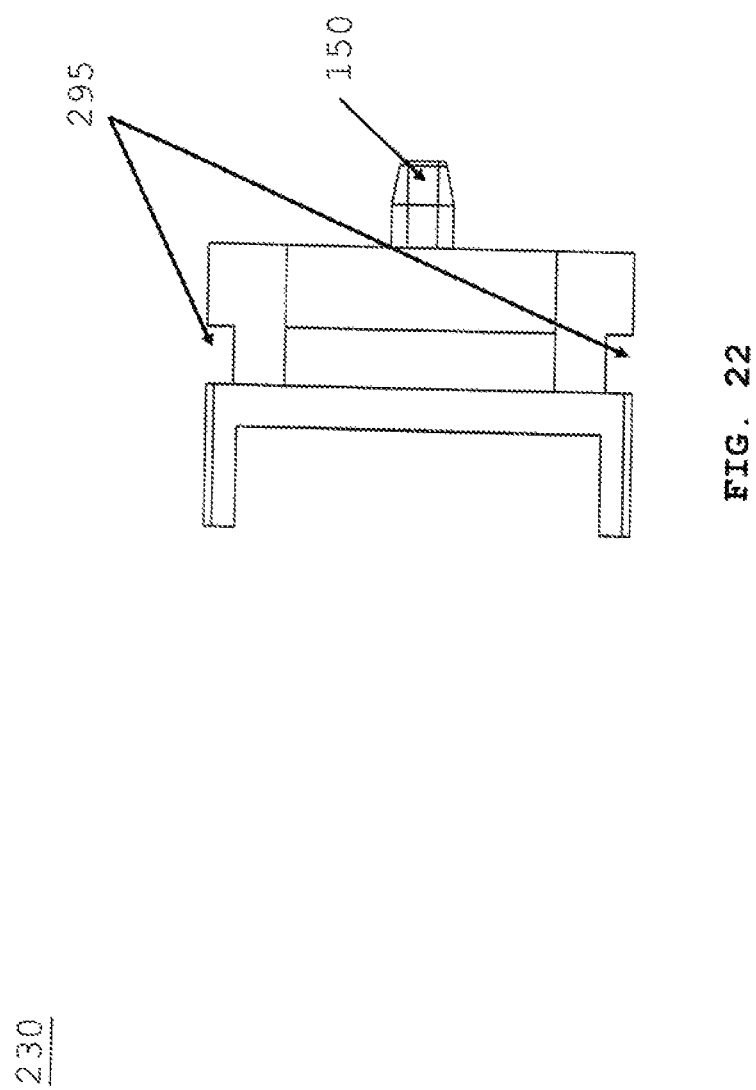

ULTRA-SMALL FORM FACTOR RECEPTACLES FOR FIBER OPTICAL CONNECTORS

CROSS-REFERENCE TO RELATED APPLICATIONS

This application is a divisional (35 USC 120) of U.S. patent application Ser. No. 16/508,541 filed on Jul. 11, 2019, now U.S. Pat. No. 10,690,864, issued Jun. 23, 2020, titled "Ultra-Small Form Factor Receptacles For Fiber Optical Connectors", which claims priority to U.S. Patent Application 62/696,710 filed on Jul. 11, 2018, titled "Ultra-Small Form Factor Receptacles For Fiber Optical Connectors", and the above applications are incorporated by reference into this application.

FIELD OF THE INVENTION

The present disclosure relates generally to ultra-small form factor receptacle for receiving optical connectors and used in fiber optic adapters and optical transceivers.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

SUMMARY OF THE INVENTION

An optical connector holding two or more LC-type optical ferrules is provided. The optical connector includes an outer body, an inner front body accommodating the two or more LC-type optical ferrules, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes a receptacle hook and a housing with an opening that accommodates the receptacle hook in a flexed position as the optical connector makes connection with the mating receptacle by introducing the receptacle hook into an optical receptacle hook recess.

An adapter or transceiver having one or more receptacles or ports configured to accept a low-profile, small form factor optical connector holding two or more LC-type optical ferrules is provided. A mating receptacle (transceiver or adapter) includes a transceiver alignment assembly for accepting, aligning and securing one or more connectors within a receptacle of transceiver. The transceiver housing has an opening that accommodates a connector hook in a flexed position as the optical connector makes connection therewith. At a first end, the transceiver alignment assembly is secured within a fiber optic stub holder comprising a top and bottom housing. At a second end, stub holder retains a plurality of fiber stubs that accept a plural plurality of fibers carrying a data signal. The stubs are aligned with alignment sleeve holder formed with transceiver alignment assembly.

BRIEF DESCRIPTION OF THE DRAWINGS

FIG. 8 is a perspective view of an alignment sleeve configured to be accepted as part of a fiber stub holder;

FIG. 9 is a perspective view of bottom housing of a two-piece fiber stub holder;

FIG. 10 is a perspective view of top housing of a two-piece fiber stub holder;

FIG. 13 is an alignment sleeve holder with hooks or latches for securing within a one-piece fiber stub holder;

FIG. 14 is a perspective view of an one-piece fiber stub holder;

FIG. 15 is a perspective view of a fiber stub;

FIG. 16 is an exploded view of a fiber stub holder configured to accept an electrical shield plate;

FIG. 20 is front view of fiber optic stub holder configured to be inserted into an adapter housing;

FIG. 21 is side view of an adapter housing; and

FIG. 22 is another embodiment of a fiber stub holder.

DETAILED DESCRIPTION

The following terms shall have, for the purposes of this application, the respective meanings set forth below.

A connector, as used herein, refers to a device and/or components thereof that connects a first module or cable to a second module or cable. The connector may be configured for fiber optic transmission or light signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, a CS connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Figure 17:
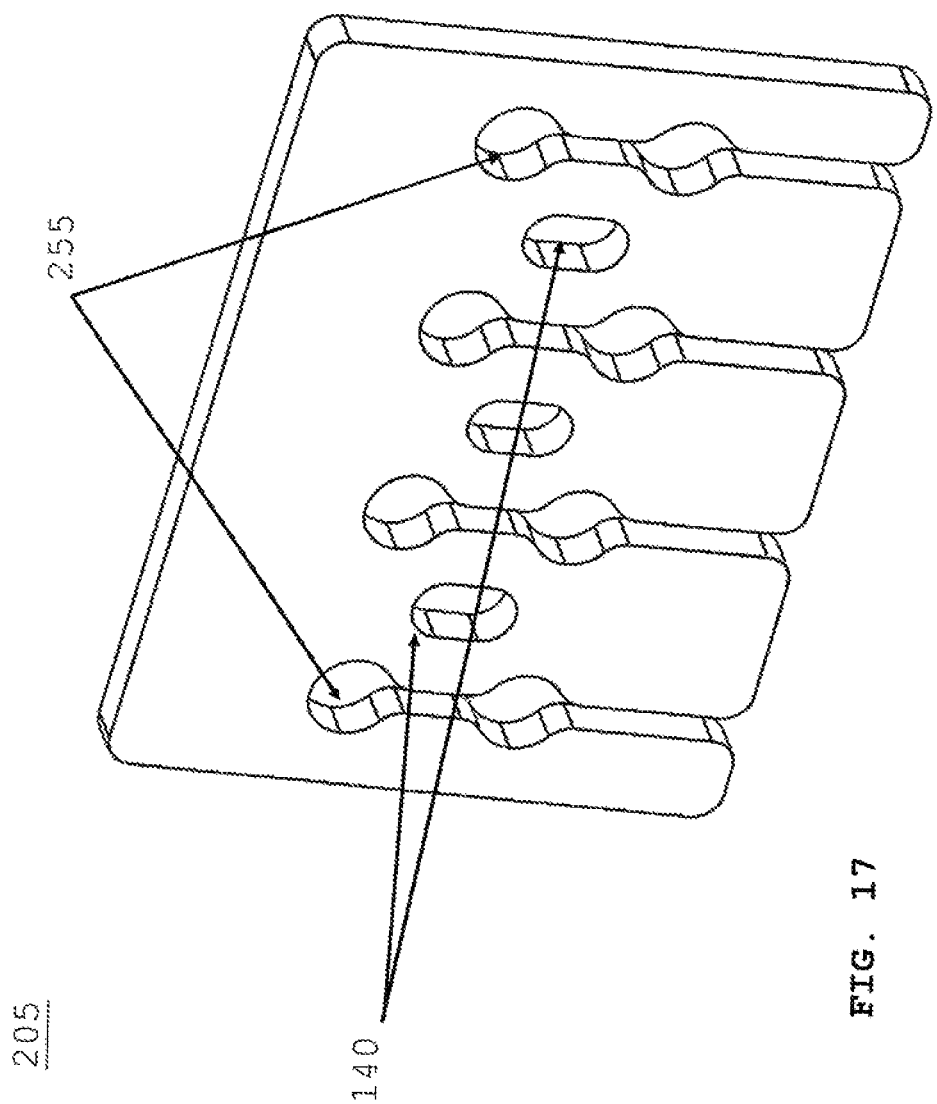
FIG. 17 is a perspective view of an electrical shield and fiber stub retainer plate.

Receptacle herein is not limited to port, opening, or channel. A receptacle can accept and releasably retain a connector 100 therein retained with a fiber stub holder, as described in the present invention. Fiber stub holder 330, 740 can be a molded one-piece (refer to FIG. 3A), or two-piece (refer to FIG. 9, FIG. 10). The fiber stub holder may be formed from plastic or metal. Metal stub holders can be deployed to reduce electro-magnetic field interference or EMI, or alternatively incorporate a metal shield as depicted in FIG. 17.

Figure 1:
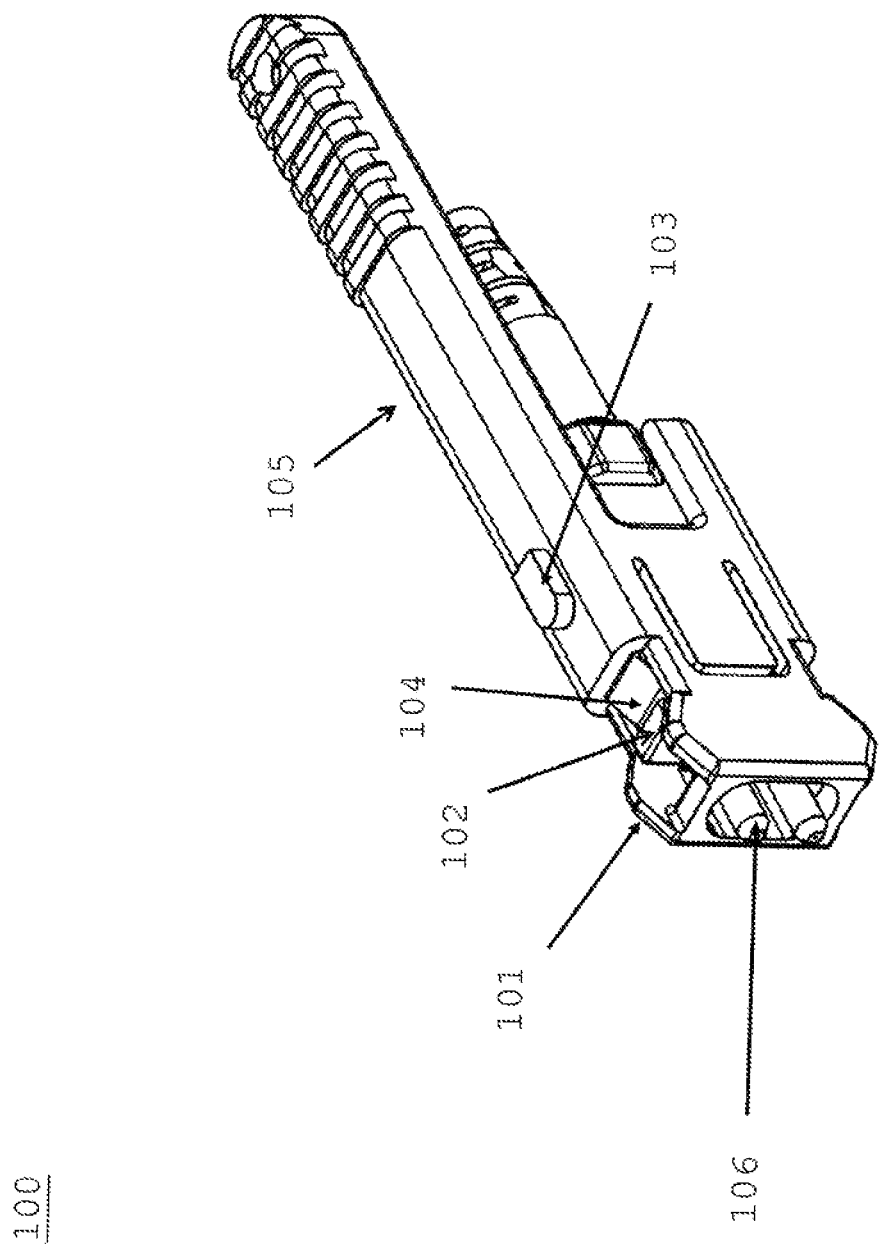
FIG. 1 is a perspective view of a prior art small form factor connector.

FIG. 1 depicts a small form-factor, low-profile micro-connector 100 that is inserted into receptacle front body 210 (refer to FIG. 2) at a proximal end thereof that can accept a plurality of connectors 100 securely therein. Connector 100 contains one or more ferrules 106. An outer housing 105 has alignment key 103 thereon to assist with inserting into receptacle 410 (e.g. proximal end of receptacle) with alignment slot 410a (refer to FIG. 4). Slot 410a and alignment key 103 reduce receptacle overall height and width by removing wall structure normally found between connectors in a receptacle. A proximal end of connector 100 is defined as closer to ferrule 106, and connector 100 further comprises ramp surface 101 formed as part of inner front body 102. Ramp 101 engages corresponding hook tip (918a, 918h) formed as part of receptacle retainer assembly 700 (refer to FIG. 7).

Figure 2:
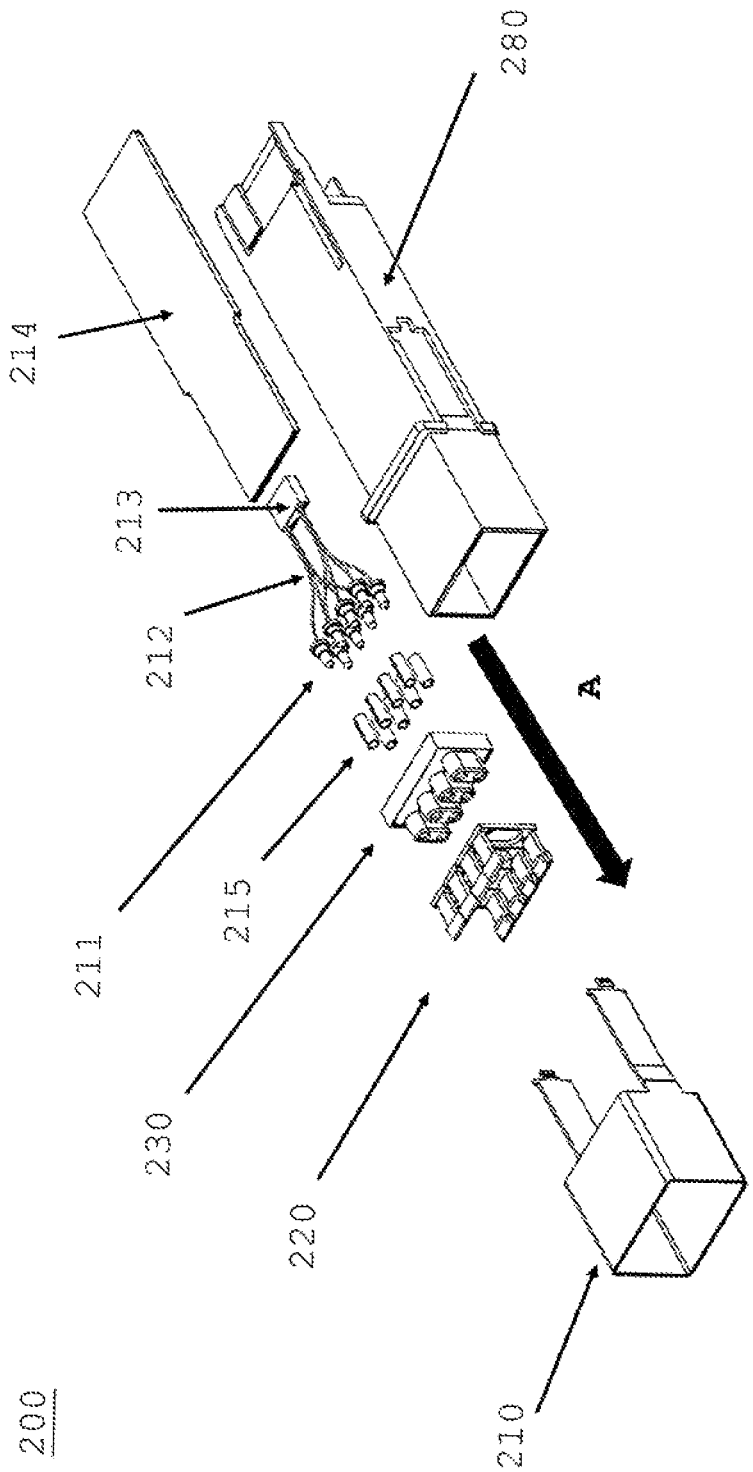
FIG. 2 is an exploded view of a transceiver housing with an array of receptacle hooks and fiber stub holders.

FIG. 2 depicts an exploded view of a two-piece press-fitted transceiver assembly configured to accept a plurality of connectors 100 secured by an array of receptacle hooks 220. Receptacle hooks 220 each accept a corresponding fiber stub holder 230 configured on a distal side to accept a plurality of alignment sleeves 215, and on a proximal side to accept the array of receptacle hooks 220. Each alignment sleeve opening is configured to accept fiber stub 211a (refer to FIG. 15). Referring to FIG. 2, each fiber stub 211a has one or more fibers 212 exiting from fiber array 213 that is in signal communication with a printed circuit board or PCB 214. The transceiver is assembled in direction of arrow "A". Receptacle front body 210 is placed over a front end of transceiver housing 280, with the PCB 214, fiber stubs 211, and other components assembled and secured within transceiver housing 280.

Figure 3:
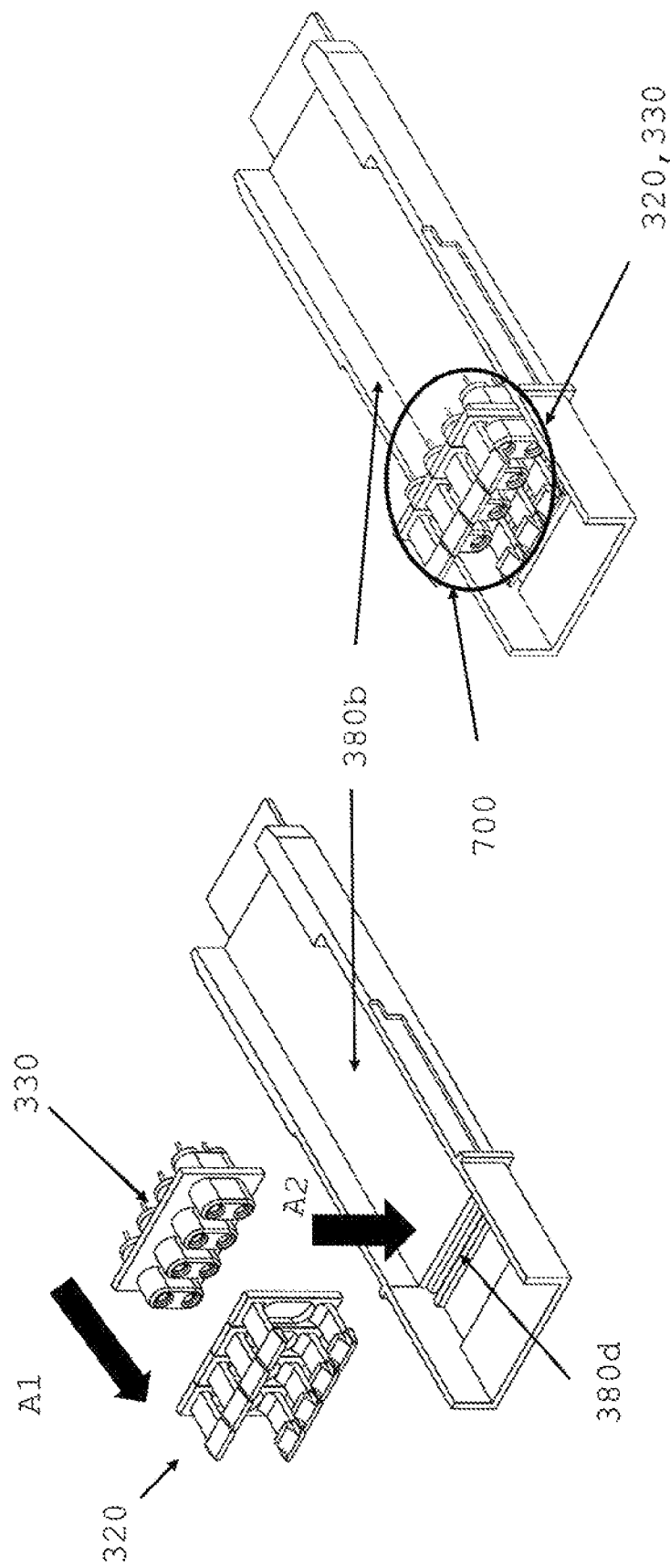
FIG. 3A is an exploded view of FIG. 2 prior to assembly of receptacle hooks and fiber stub holders and placement into transceiver bottom housing.
FIG. 3B is a perspective view of bottom transceiver housing with array of receptacle hooks and fiber stub holders placed therein.

FIG. 3A depicts transceiver bottom housing 380b with widthwise slots 380d configured to accept one-piece fiber stub holder 330 and array of receptacle hook 320 to form receptacle retainer assembly 700 (FIG. 3B) configured to retain one or more connectors 100 within transceiver housing 380. Fiber stub holder 330 is assembled in direction of arrow "A1", then inserted into widthwise slot 380d according to arrow "A2", within bottom transceiver housing 380b, as depicted in FIG. 3B.

Figure 4:
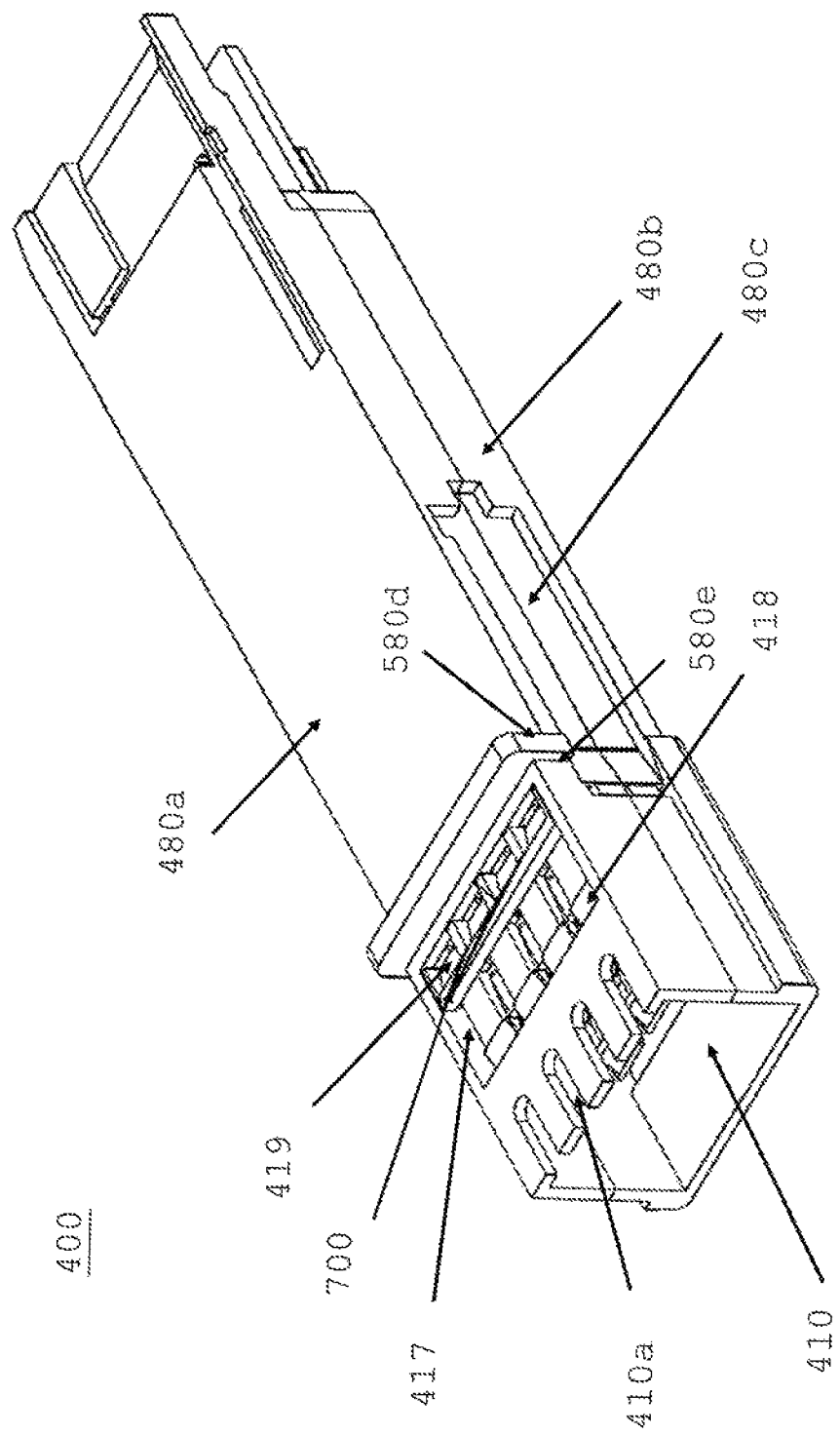
FIG. 4 a perspective view of a transceiver assembled according to an embodiment of the present invention.

FIG. 4 depicts another embodiment of a transceiver housing with receptacle retainer assembly 700 therein. In this embodiment, fiber stub holder is two-piece. Receptacle front body 210 is configured to accept receptacle retainer assembly 700 comprising a two-piece fiber stub holder. Assembled transceiver comprises top housing 480a and bottom housing 480b that holds the following components. Housing 480 contains recess 480c that used with a removal tool (not shown) configured to remove transceiver (FIG. 4) from a panel assembly (not shown). Front body 210 (FIG. 2) contains opening 417 on one or both sides of housing that receives flexing of connector retention/adapter hooks 418 upon insertion of connector 100 into receptacle 410. Receptacle retainer assembly latch 419 secures receptacle retainer assembly 700 to fiber stub holder 740 (refer to FIGS. 9, 10), which comprises top housing 740a and bottom housing 740b. Top housing 480a has lip 580d accepted into slot 580e to form transceiver housing 480.

Figure 5:
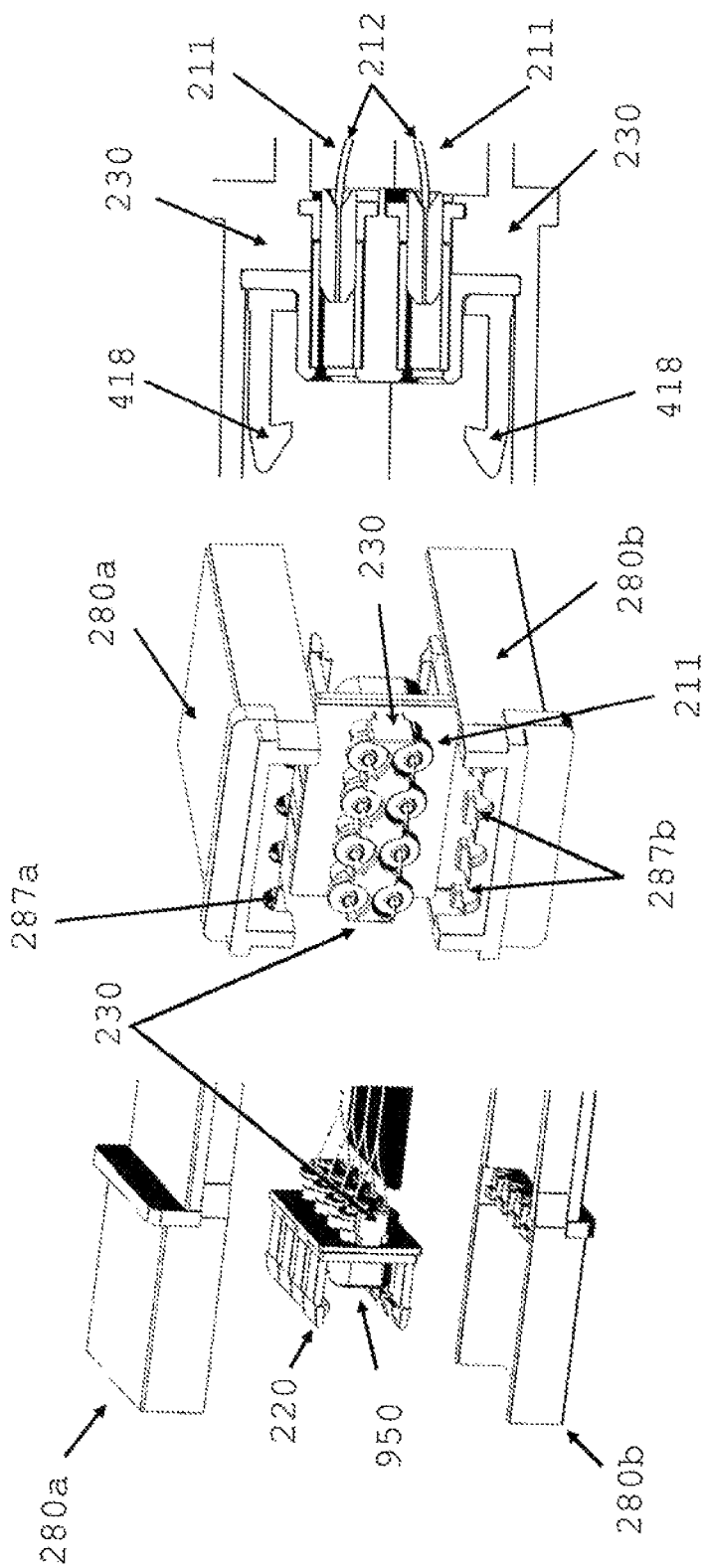
FIG. 5A is an exploded view of top and bottom housing portions of transceiver housing with components.
FIG. 5B is an exploded view of transceiver housing without front body attached.
FIG. 5C is a side view of fiber stub retained in fiber stub holder.

FIG. 5A depicts an exploded view of transceiver top housing 280a and bottom housing 280b. Between housing portions is an array of receptacle hooks 220, in either side of alignment holder 950. The hooks are configured to receive and secure connector 100, at a proximal end thereof. At distal end of the retainer assembly is the array of fiber stubs 211. FIG. 5B is a front view of FIG. 5A without front body 210. Top housing 280a has a plurality of half or semi-circle cut-outs 287a and bottom housing 280b has corresponding cut-outs 287b that when the top and bottom housing are secured together, cut-outs are configured to retain the fiber stub 211 about fiber stub flange 911a. 1 (refer to FIG. 7). FIG. 5C depicts side view of fiber stub 211 secured within distal end of retainer assembly or fiber stub holder 230.

Figure 6:
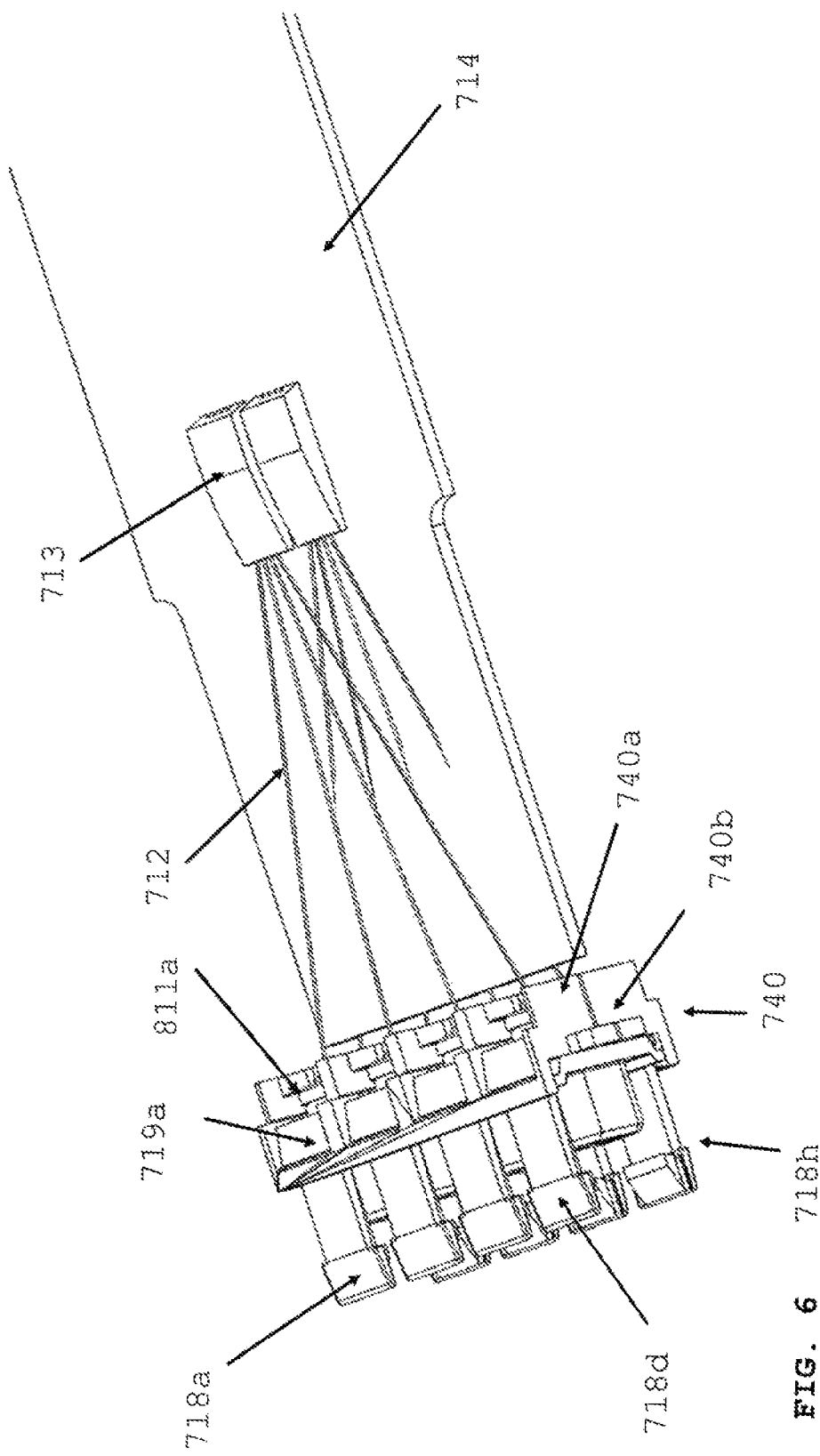
FIG. 6 is a cut-away view of fiber stub holder connected to transceiver electronic.

FIG. 6 depicts PCB 714 in communication using fiber array 713 via optical fiber 712 formed as part of ferrule 106. Ferrule 106 with fiber therein is inserted into a distal end of fiber stub holder 211a (refer to FIG. 15). Top housing 740a and bottom housing 740b form housing 740 that secures array of fiber stub holders 211. Referring to FIG. 15, fiber stub 211a can be retained in an unitary fiber stub holder 230 (FIG. 16 and FIG. 2). Referring to FIG. 6, each fiber stub holder 811a is in line with opposing connector hooks (718d, 718h) or may be called an adapter latch 718a that secures a data center or two fiber optical connector 100 between hooks 718d top hook and 718h bottom hook. Connector 100 is inserted into alignment sleeve holder at proximal end 950a (refer to FIG. 7). Latch 719a secures fiber stub holder with alignment sleeve holder within front body 210 of transceiver housing 740.

Figure 7:
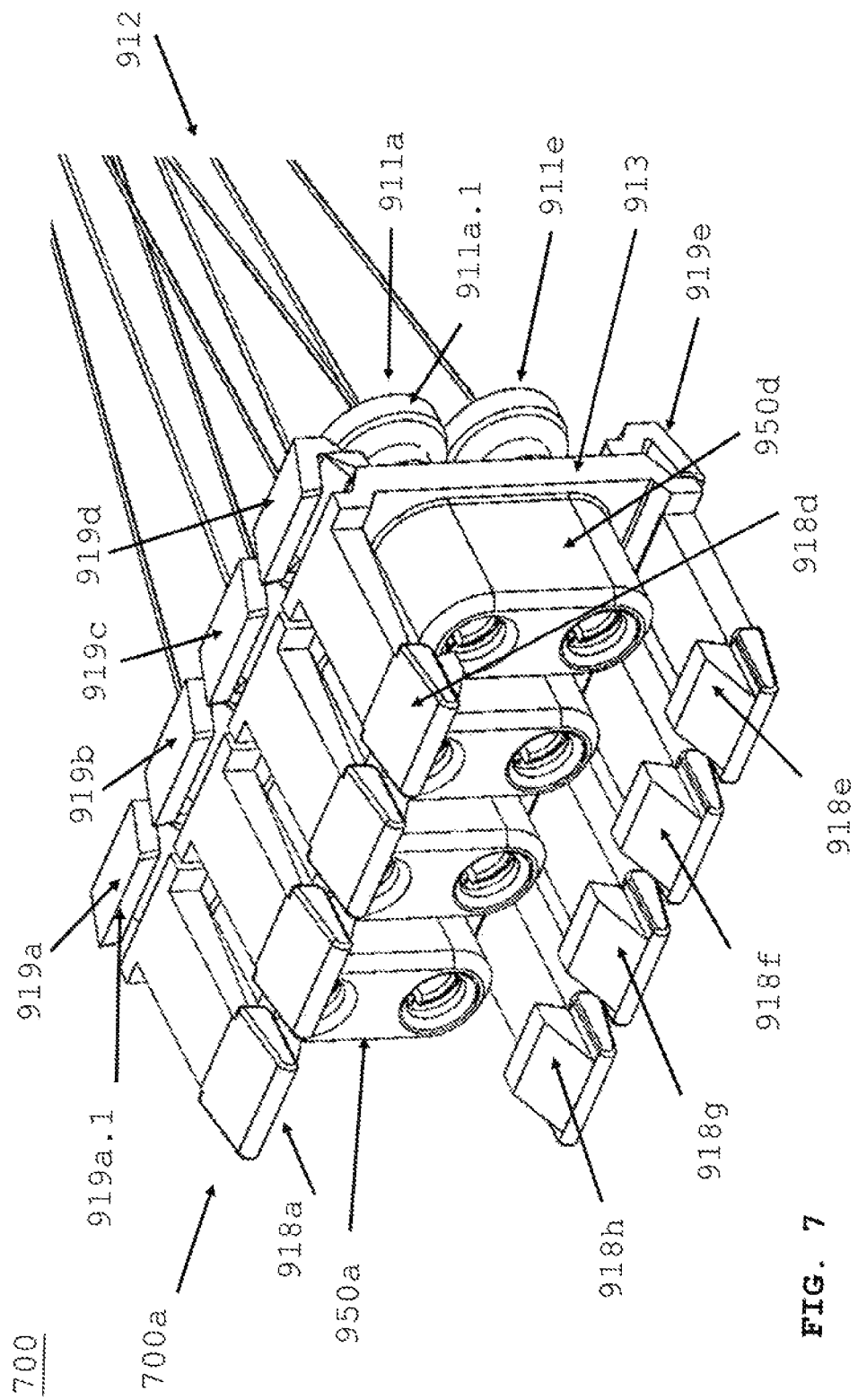
FIG. 7 is an array of fiber stub holders and adapter hooks to retain a fiber optic connector.

FIG. 7 depicts array alignment sleeve holder (950a, 950d) with opposing connector or adapter hook (918a-918d, 918e-918h) configured to accept connector 100. Opposing hook pairs ((918a, 918h), (918b-918d), (918g-918e)) are lifted by ramp 101 and the opposing hook pair is secured within connector recess 104. Fiber stub latches (919a-919d) have opposing latches (e.g. 919e opposes 919d), which secures the retained assembly into a transceiver front body or adapter housing 200 (refer to FIG. 21), or to a fiber stub holder 230 (refer to FIG. 20), which is then inserted into adapter housing 200, with adapter latches 295 secured within corresponding adapter housing cut-out 275 (see FIG. 20, FIG. 21). Face 919a. 1 of each fiber stub latch 919a is secured with recess 740a. 1 (refer to FIG. 10) of fiber stub holder top housing 740a. The opposing latches are formed as part of main body 913 of the retainer receptacle assembly 700. Assembly 700 is made up of individual retainer receptacle assembly units 700a.

FIG. 8 depicts a front view of alignment sleeve holder 850 with opposing openings (850a. 1, 850a. 2) configured to accept data center connector 100, the latter is formed as part of receptacle retainer assembly 700. Alignment sleeve holder 850 has fiber stub latch 919a with face 919a. 1 that engages fiber stub holder 740 to secure retainer to holder 740. FIG. 9 depicts bottom housing 740b of two-piece fiber stub holder 740 with opening 740b. 1 that accepts latch 919b for securing alignment sleeve holder with bottom housing 740b.

FIG. 10 depicts top housing 740a of two-piece fiber stub holder 740. Opening 740a. 1 accepts fiber stub latch 919a to secure alignment sleeve holder 850 within top housing 740a. To form fiber stub housing 740, post 740c is received within press-fit opening 740d, and likewise post 740e is received within press-fit opening in top housing 740a, as shown by dotted lines.

Figure 11:
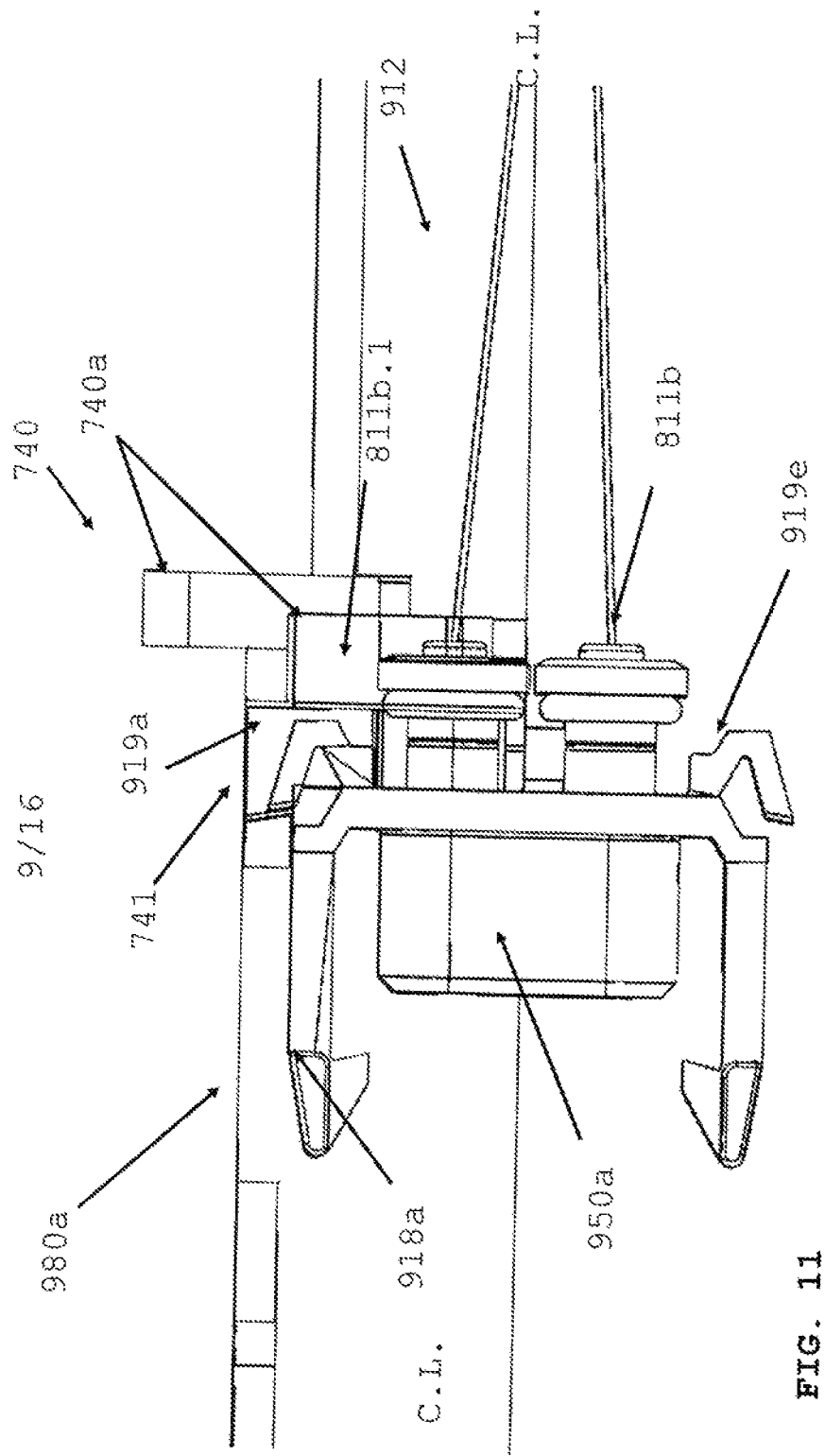
FIG. 11 is a perspective view of an alignment sleeve holder with a fiber stub inserted therein.

FIG. 11 depicts fiber stub 811b inserted into a corresponding alignment sleeve holder opening 950a, and further secured with flange 811b. 1 inside fiber stub top housing 740a. Latch 919a is secured behind stop face 741 of fiber stub holder 740. Upon insertion of connector 100 into receptacle along center line (C.L.), hook 918a (as well as opposing hook 918h) are pushed into gap 980a (and 980b not shown) until connector 100 is fully inserted into the receptacle over alignment sleeve 950a. Optical fiber 912 interconnects connector 100 with PCB 714.

Figure 12:
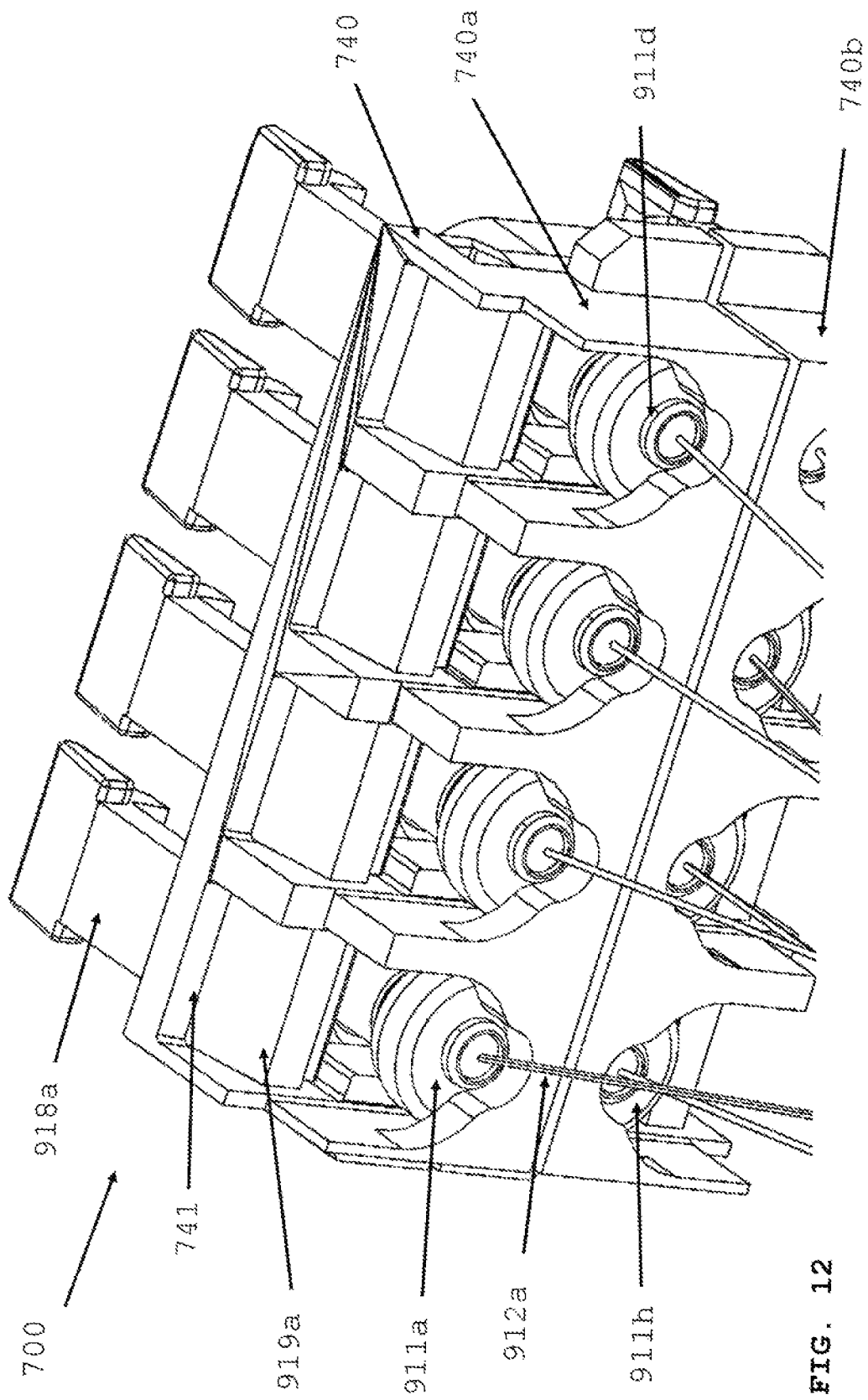
FIG. 12 is front, perspective view of a plurality of fiber stubs with a fiber stub holder.

FIG. 12 depicts a rear view of a fully assembled fiber stub holder 740 with a plurality of fiber stubs (911a-911h) at a second end with optical fiber 912a therethrough, and receptacle retainer assembly 700 at a first end. Latch 919a is secured up against surface 741 of an opening within fiber stub holder 740.

FIG. 13 depicts alignment sleeve holder 850 prior to insertion (along direction of arrows "I") into a one-piece fiber stub holder 740. Openings 740a. 1 and 740b. 1 accept fiber stub latches (919a, 919b) to secure alignment sleeve holder within fiber stub holder 740. FIG. 14 depicts fiber stub holder 740 as one-piece, with top opening 740a. 1 and bottom opening 740b. 1 as described above. FIG. 15 depicts fiber stub 211a with flange 211a. 1. Flange 211a. 1 is retained within fiber stub holder 740 to secure fiber stub 211a therein, or is secured to shield plate 205 described below.

FIG. 16 depicts an exploded view of another embodiment of retainer assembly secured within a transceiver housing. The assembly depicts array of adapter hook 220 each opposing hook pair with an alignment sleeve 215 between the opposing hook pair. Hooks 220 are secured along dotted arrow to latch post 230a in Step 1. In Step 2, alignment sleeves 215 are placed over corresponding fiber stub 211, which is then inserted into an alignment sleeve opening in Step 3. In Step 4, electrical interference shield or metal shield 205 is inserted onto posts 150 at distal side of fiber stub holder 230 (refer to FIG. 19 and FIG. 22). FIG. 17 depicts metal shield 205 with openings 140 to receive posts 150 formed at a distal end of fiber stub holder 230. Fiber stub openings 255 receive fiber stub 211 (FIG. 16). The metal shield protects an optical light signal from the electromagnetic energy of the transceiver electronics PCB 714.

Figure 19:
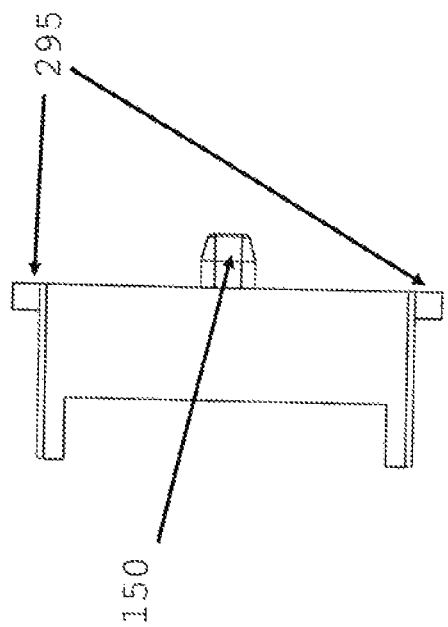
FIG. 19 is a side view of FIG. 17.
Figure 18:
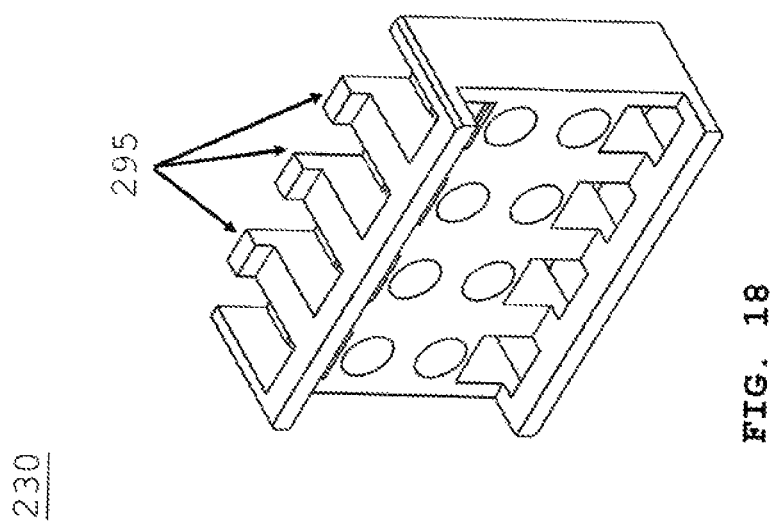
FIG. 18 is a perspective view of a one-piece fiber stub holder with latches to secure within an adapter housing.

FIG. 18 depicts another one-piece embodiment of fiber stub holder 230 with adapter housing latch 295 position on a distal end, with an opposing latch (refer to FIG. 19). A plurality of latches 295, as depicted in FIG. 20 also, are secured within adapter housing cut-out or opening 275 (refer to FIG. 21) to secure fiber stub holder 230 therein. FIG. 22 depicts a side view of another embodiment of fiber stub holder 230. Adapter housing latches 295 form a channel for securing the fiber stub holder within a receiver housing.

In the above detailed description, reference is made to the accompanying drawings, which form a part hereof. In the drawings, similar symbols typically identify components, unless context dictates otherwise. For example, 211 or 811 is generally a fiber stub holder while 211a is one of a plurality of fiber stub holders.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

The invention claimed is:

1. A transceiver housing for holding one or more optical connectors, comprising: a two-piece fiber stub holder with a top housing and a bottom housing; a receptacle retainer assembly having a pair of opposing hooks at a first end of the receptacle retainer assembly to accept and secure the one or more optical connectors at a first end of the transceiver housing, and a latch at a second end of the receptacle retainer assembly is secured with a stop face formed as part of the two-piece fiber stub holder; the two-piece stub holder accepts a fiber stub having a ferrule with a fiber therein; and wherein the fiber stub has a flange, and the flange secures the fiber stub within the two-piece fiber stub holder.

2. The transceiver housing according to claim 1, wherein the bottom housing has a widthwise slot configured to accept the receptacle retainer assembly.

3. The transceiver housing according to claim 1, further comprising a receptacle front body releasably attached to the first end of the transceiver housing, the first end of the transceiver housing accepts the one or more optical connectors.

4. The transceiver housing according to claim 3, wherein the receptacle front body at a distal end accepts the receptacle retainer assembly.

5. The transceiver housing according to claim 3, wherein the receptacle front body has one or more openings on a first side and a second side, the one or more openings accept a pair of opposing hooks that flex outward when the one or more optical are inserted into a first end of the receptacle front body.

6. The transceiver housing according to claim 1, wherein the receptacle retainer assembly pair of opposing hooks further comprises an alignment sleeve therebetween configured to accept the one or more optical connectors.

7. The transceiver housing according to claim 1, wherein the receptacle retainer assembly comprises a main body with opposing latches, the latches are secured with the two-piece fiber stub holder.

* * * * *